Patented Jan. 13, 1931

1,788,896

UNITED STATES PATENT OFFICE

LLOYD C. SWALLEN, OF TERRE HAUTE, INDIANA, ASSIGNOR TO COMMERCIAL SOLVENTS CORPORATION, OF TERRE HAUTE, INDIANA, A CORPORATION OF MARYLAND

HYDROGENATION OF CROTONALDEHYDE

No Drawing. Original application filed November 7, 1927, Serial No. 231,781. Divided and this application filed September 16, 1929. Serial No. 393,128.

This invention is a process of making butyraldehyde or butyl alcohol or both simultaneously, by the hydrogenation of crotonaldehyde. The process may be illustrated by the following equations:

(1) 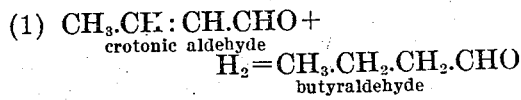

(2) 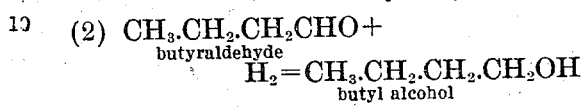

In practice, when crotonaldehyde is hydrogenated the product usually contains butyraldehyde and butyl alcohol, the precise proportions of these ingredients being dependent on a variety of factors such as the proportion of hydrogen present, temperature, space velocity, and catalyst.

This invention relates to a process in which an improved catalyst is used with the result that a good conversion is obtained and only a small quantity of by-products is formed. The by-products ordinarily obtained in the hydrogenation are reaction products of butyraldehyde—either with itself or with butyl alcohol. Butyl butyrate and dibutyl butylal are two by-products that are ordinarily obtained in rather large quantities, and one of the advantages of the present invention lies in the prevention of the formation of substantial quantities of these impurities.

In preparing a catalyst for use in the process, ordinary sodium silicate is diluted with 10 times its weight of distilled water. A 10% solution of copper nitrate is prepared and is gradually added to the sodium silicate solution at ordinary temperature and with constant stirring until precipitation is complete. The precipitate is then recovered from the mixture by filtration, using suction to remove as much liquid as possible. The resultant filter cake is dried in the air at ordinary temperatures until the material sets to form a rather hard, brittle mass. The mass is then pulverized and screened to produce a catalytic material of about 8–14 mesh. The granules are washed thoroughly by boiling them with distilled water for an hour, draining, and then rewashing them several times with cold distilled water. The catalyst is then again dried in the air at room temperature.

In the practise of my process, a mixture of crotonaldehyde vapor and hydrogen in the proportion of 1 mol. of the former to 2 mols. of the latter, is passed thru the catalyst at a temperature of about 170° C. Under these conditions, the crotonaldehyde is completely hydrogenated to form a mixture of about 2 parts of butyl alcohol to one part of butyraldehyde. When the mixture of crotonaldehyde and hydrogen is passed thru the catalyst at a rate of 1.7 g. crotonaldehyde vaporized per c. c. of catalyst per hour, the product obtained contains less than 4% of high-boiling impurities. The product is recovered by passing the mixture leaving the catalyst thru an ordinary water condenser to liquefy it. Under these conditions the effluent gas from the condenser is practically pure hydrogen. If the molecular proportion of the reacting ingredients is adjusted so that there is a large excess of hydrogen, for example, about 5 mols. of hydrogen to 1 mol. of crotonaldehyde, the product obtained is about 90% butyl alcohol and 10% butyraldehyde. By increasing the space velocity and using molecular proportions of the reacting ingredients, one may obtain a product which consists very largely of butyraldehyde, having only a small proportion of butyl alcohol.

While 170° C. has been described as the optimum temperature for catalysis, the catalyst is active over a wider range, and temperatures between 120° and 200° C. may be used.

In practise of the process it is not necessary to make a preliminary reduction of the catalyst with hydrogen. The washed granules may be used directly with good results. However, the activity of the catalyst is increased if it is given a preliminary reduction by passing pure hydrogen thru it at about 350° C. and I prefer to follow this latter procedure. The catalyst is preferably reduced in the apparatus in which it is later to be used.

In the preparation of the catalyst the reaction which occurs when copper nitrate is added to sodium silicate is presumed to produce copper silicate and sodium nitrate. The sodium nitrate is soluble and is removed from the catalyst during the preliminary washing. It is quite possible that during the preliminary reduction of the catalyst, if this is done, or during the first few moments of use in the process, the copper silicate catalyst may undergo some further chemical change. For example, a mixture of finely divided silica and copper may be the final result. Indeed it is possible that the primary reaction of copper nitrate and sodium silicate may produce a product comprising hydrated copper oxide and hydrated silicon dioxide, altho this is considered improbable. In place of copper nitrate, other salts of copper, such as the chloride or sulfate may be used in the preparation of the catalyst. In any event, the term "copper silicate" as used in the appended claims is intended to describe and is limited to the reaction product of a soluble copper salt and sodium silicate as described in this specification.

This is a divisional application of my application U. S. Serial No. 231,781, for "Hydrogenation of crotonaldehyde", filed November 7, 1927.

Now having fully described my invention, I claim the following as new and novel:

1. A process for producing butyraldehyde and butyl alcohol which comprises passing a mixture of hydrogen and crotonaldehyde over a reduced copper silicate catalyst at a temperature of 120–120° C.

2. A process for producing butyraldehyde and butyl alcohol which comprises passing a mixture of hydrogen and crotonaldehyde in molecular proportion over a reduced copper silicate catalyst at a temperature of about 170° C.

In testimony whereof I affix my signature.

LLOYD C. SWALLEN.

CERTIFICATE OF CORRECTION.

Patent No. 1,788,896. Granted January 13, 1931, to

LLOYD C. SWALLEN.

It is hereby certified that error appears in the printed specification of the above numbered patent requiring correction as follows: Page 2, line 35 claim 1, for "120-120°C" read 120-200°C; and that the said Letters Patent should be read with this correction therein that the same may conform to the record of the case in the Patent Office.

Signed and sealed this 3rd day of March, A. D. 1931.

(Seal)

M. J. Moore,
Acting Commissioner of Patents.